(12) United States Patent
Austefjord et al.

(10) Patent No.: US 9,464,492 B2
(45) Date of Patent: Oct. 11, 2016

(54) VIDEOMETRIC SYSTEMS AND METHODS FOR OFFSHORE AND OIL-WELL DRILLING

(75) Inventors: Arne Austefjord, Sandnes (NO); Pal Jacob Nessjoen, Trondheim (NO)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 918 days.

(21) Appl. No.: 13/695,241

(22) PCT Filed: Apr. 28, 2011

(86) PCT No.: PCT/GB2011/000666
§ 371 (c)(1),
(2), (4) Date: Nov. 24, 2012

(87) PCT Pub. No.: WO2011/135311
PCT Pub. Date: Nov. 3, 2011

(65) Prior Publication Data
US 2013/0345878 A1 Dec. 26, 2013

(30) Foreign Application Priority Data

Apr. 29, 2010 (GB) .................................. 1007200.7

(51) Int. Cl.
| | |
|---|---|
| *G01M 1/38* | (2006.01) |
| *G05B 21/00* | (2006.01) |
| *E21B 19/16* | (2006.01) |
| *B66C 13/02* | (2006.01) |
| *B66C 13/08* | (2006.01) |
| *B66C 23/16* | (2006.01) |
| *H04N 7/18* | (2006.01) |

(52) U.S. Cl.
CPC ............ *E21B 19/165* (2013.01); *B66C 13/02* (2013.01); *B66C 13/085* (2013.01); *B66C 23/16* (2013.01); *H04N 7/18* (2013.01)

(58) Field of Classification Search
CPC ..... E21B 19/165; H04N 7/18; B66C 13/085; B66C 13/02; B66C 23/16
USPC .................. 700/275–280; 414/22.63, 22.65; 703/10; 166/379, 382, 85.1, 85.5
See application file for complete search history.

(56) References Cited

U.S. PATENT DOCUMENTS

| | | | |
|---|---|---|---|
| 7,104,316 B1 | 9/2006 | Hobgood | |
| 8,232,892 B2 * | 7/2012 | Overholt et al. | .......... 340/853.2 |
| 8,793,114 B2 * | 7/2014 | Shafer et al. | ................... 703/10 |
| 2004/0223533 A1 | 11/2004 | Dishaw et al. | |
| 2006/0104747 A1 * | 5/2006 | Zahn et al. | ................ 414/22.63 |
| 2008/0156531 A1 * | 7/2008 | Boone | ...................... E21B 7/06 175/27 |
| 2008/0164025 A1 * | 7/2008 | Peter | ................... E21B 47/0002 166/255.2 |
| 2008/0282847 A1 | 11/2008 | Halse | |
| 2009/0159294 A1 | 6/2009 | Abdollahi et al. | |

OTHER PUBLICATIONS

International Application No. PCT/GB2011/000666 Search Report and Written Opinion dated Jul. 6, 2012.

* cited by examiner

*Primary Examiner* — Mohammad Ali
*Assistant Examiner* — Ziaul Karim
(74) *Attorney, Agent, or Firm* — Conley Rose, P.C.

(57) ABSTRACT

A system is disclosed for determining the position of a downhole drill pipe relative to a pipe handling device. The system comprises: an imaging means arranged to capture an image of the drill pipe in a region of the pipe for engagement by the device; and a processor operable to analyze said captured image and to determine therefrom the position of the drill pipe relative to said device.

18 Claims, 6 Drawing Sheets

VIDEOMETRIC SYSTEMS AND METHODS FOR OFFSHORE AND OIL-WELL DRILLING

CROSS REFERENCE TO RELATED APPLICATIONS

This application is a 35 U.S.C. §371 national stage application of PCT/GB2011/000666 filed Apr. 28, 2011, which claims the benefit of UK application 1007200.7 filed Apr. 29, 2010, both of which are incorporated herein by reference in their entirety for all purposes.

BACKGROUND

1. Field of the Disclosure

The present disclosure relates to the provision and use of videometry in various operations relating to the field of oil-well drilling, particularly offshore drilling operations. More particularly, the disclosure relates to a system for determining the position of a downhole drill pipe relative to a pipe handling device.

2. Background of the Technology

Videometry may take various forms but can generally be considered to relate to the use of optical sensing devices to automatically receive and interpret an image of a real scene, to obtain geometrical information, and to control directional information, the location or orientation of a component part, or simply the presence or absence of an object or component in a particular environment.

Turning now to consider more particularly the nature of oil field drilling operations themselves, it will be appreciated a drill string as is commonly run in a well bore is made up of a series of interconnected drill pipes. Additional pipes are added to the top of the string at successive stages in the drilling process as the string becomes longer, and hence deeper in the well. The reverse process occurs when a drill string is being retracted from a well.

When running a drill string into or out of a well bore, a combination torque wrench and spinning wrench is typically used for connecting and disconnecting adjacent drill pipes and/or pre-assembled stands. In this context, a stand is a number (typically two to four) of preassembled drill pipes which are stored in an intermediate storage rack until such time as they are required to be added to a drill string as it is run into a well.

Such combination torque wrenches and spinning wrenches are commonly known as "iron roughnecks". It is important to ensure that the iron roughneck is positioned at the correct height relative to the joint to be made up or broken. As tool joints often vary in terms of diameter or length, instrumentation to achieve this has been found to be unsatisfactory and so height positioning is generally done manually. Additionally, not all of the drill pipes used in a typical string are of exactly equal length, and also the height of the uppermost pipe in a string sticking up out of the well bore between successive drilling (or hoisting) stages, which is commonly known as the "stick-up height", will be slightly different each time.

SUMMARY

It is an object of the present disclosure to provide an improved system for determining the position of a downhole drill pipe relative to a pipe handling device.

In its most general sense, the present disclosure provides a system for determining the position of a downhole drill pipe relative to a pipe handling device, the system comprising: an imaging means arranged to capture an image of the drill pipe in a region of the pipe for engagement by the device; and a processor operable to analyse said captured image and to determine therefrom the position of the drill pipe relative to said device.

In an embodiment of the invention, the pipe handling device is a wrench arrangement, and the system is configured to control the wrench arrangement for connecting adjacent drill pipes in a downhole string, wherein said imaging means is arranged to capture an image of the drill-string in a region above the well bore, said processor being operable to analyse said captured image and to determine therefrom the position of the uppermost end of a drill pipe projecting from the well bore, the system further comprising control means operable in response to signals from the processor to control the position of the wrench arrangement in dependence on the position of the uppermost end of said drill pipe projecting from the well bore.

Optionally, the processor is configured to determine said position of the uppermost end of the drill pipe via a motion detection algorithm, the imaging means capturing a sequence of said images whilst the wrench arrangement is moved towards the drill pipe projecting from the well bore such that the sequence of images includes the static position of the drill pipe and the moving wrench arrangement, and the processor being configured to filter out parts of said image sequence containing motion and to determine from the remaining static parts of the image the position of the uppermost end of the drill pipe.

Conveniently, said imaging means is positioned on the opposite side of the drill pipe to the wrench arrangement.

Alternatively, the processor is configured to determine said position of the uppermost end of the drill pipe via a background subtraction algorithm, the imaging means capturing an image of the drill pipe excluding the wrench arrangement but including a predetermined background behind the drill pipe, and the processor being configured to filter out parts of said image which correspond to said known background and to determine from the remaining parts of the image the position of the uppermost end of the drill pipe.

Preferably, the system further comprises a memory configured to store a datum image of said background without said drill pipe, and wherein said processor compares said captured image with said datum image to filter out said parts of the captured image which correspond to the background.

Advantageously, said imaging means is positioned on said wrench arrangement.

Conveniently, said imaging means is arranged to view said drill pipe in a direction substantially orthogonal to an operational axis of the wrench arrangement.

In another embodiment, the system may be configured to control a pipe handling device in the form of a wrench arrangement for disconnecting adjacent drill pipes in a downhole string, wherein said imaging means is arranged to capture an image of the joint between connected ends of said adjacent drill pipes in a region of a drill-string above the well bore, said processor being operable to analyse said captured image and to determine therefrom the position of the uppermost end of the lower of said drill pipes projecting from the well bore, the system further comprising control means operable in response to signals from the processor to control the position of the wrench arrangement in dependence on the position of the uppermost end of said lower drill pipe projecting from the well bore.

Preferably, said processor is configured to analyse the edge contours of said drill-string in said captured image to determine the approximate position of said joint and then to perform an edge detection algorithm on the region of said image depicting said joint to determine the uppermost end of the lower drill pipe.

In another embodiment, the pipe handling device is an elevator configured to lift and lower drill pipes, the elevator comprising a collar configured to fit around and grip a drill pipe, the imaging means being arranged to capture an image of said collar, and the processor being operable to analyse said image and to determine therefrom whether or not a drill pipe is received within the collar.

Preferably, the system further comprises a memory configured to store a first datum image from said imaging means, the first datum image depicting said collar without a drill pipe therein.

Conveniently, said memory is further configured to store a second datum image from said imaging means, the second datum image depicting said collar with a drill pipe received therein.

Advantageously, said processor is operable to compare said captured image with the or each said datum image and to determine from said comparison whether or not the drill pipe is received within said collar.

Optionally, said processor is operable to perform said comparison in accordance with a colour based segmentation algorithm.

Conveniently, said imaging means is a video camera.

Alternatively, said imaging means is a still camera.

Preferably, said still camera is configured to capture a plurality of successive images.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Some level of automation has been proposed previously for positioning an iron roughneck relative to the drill pipe sticking up out of a well. Typically, this involves lowering the iron roughneck to its lowermost position relative to the drilling floor, advancing the iron roughneck towards the drill pipe and then lifting it around the drill pipe. As the iron roughneck moves up the drill pipe in the floor, a mechanical switch is activated when the iron roughneck reaches the slightly wider shoulder of the tool joint at the end of the pipe. However, this mechanised method is disadvantageous for two principal reasons. Firstly, it involves moving the iron roughneck along a path which takes in a detour (downwards and then upwards again to find the tool joint) and which is hence not the optimum shortest route to engagement with the tool joint, thus costing valuable time. Secondly, problems can occur with this method because not all tool joints have the same configuration which can confuse the system and result in misplacement of the iron roughneck.

There is therefore a need for an improved system to automatically control a wrench arrangement for connecting or disconnecting adjacent drill pipes in a downhole drill string.

Another area of oilfield drilling operations to which embodiments of the present invention may be directed is the operation of an elevator on a drilling rig. As will be appreciated by those of skill in the art, an elevator is a device which typically hangs below the top drive of a drilling platform and which is used to lift stands in or out of the well hole. The elevator typically takes the form of an openable collar which is configured to be opened to receive a length of pipe and then closed around the pipe so as to grip it securely. As will be appreciated, because stands may comprise three or four individual drill pipes, they can be very long which means that the elevator is operated at a significant height above the drilling floor.

It is important to be able accurately to determine whether or not the elevator is properly closed around a drill pipe before the drill pipe is released by a pipe handling system lower down the length of the string. If the pipe handling system were to release its grip on the stand before the elevator is properly closed around the stand, the stand will fall down towards the drill floor. This is an extremely dangerous and unpredictable event.

Currently, whether or not an elevator is properly closed around a drill pipe is verified manually by drilling workers looking up from the drill floor with the naked eye or sometimes with a video surveillance (CCTV) system. Both of these methods are open to human error.

There is therefore a desire for an automated system operable to determine whether or not an elevator is properly closed around a drill pipe.

Figure 1:
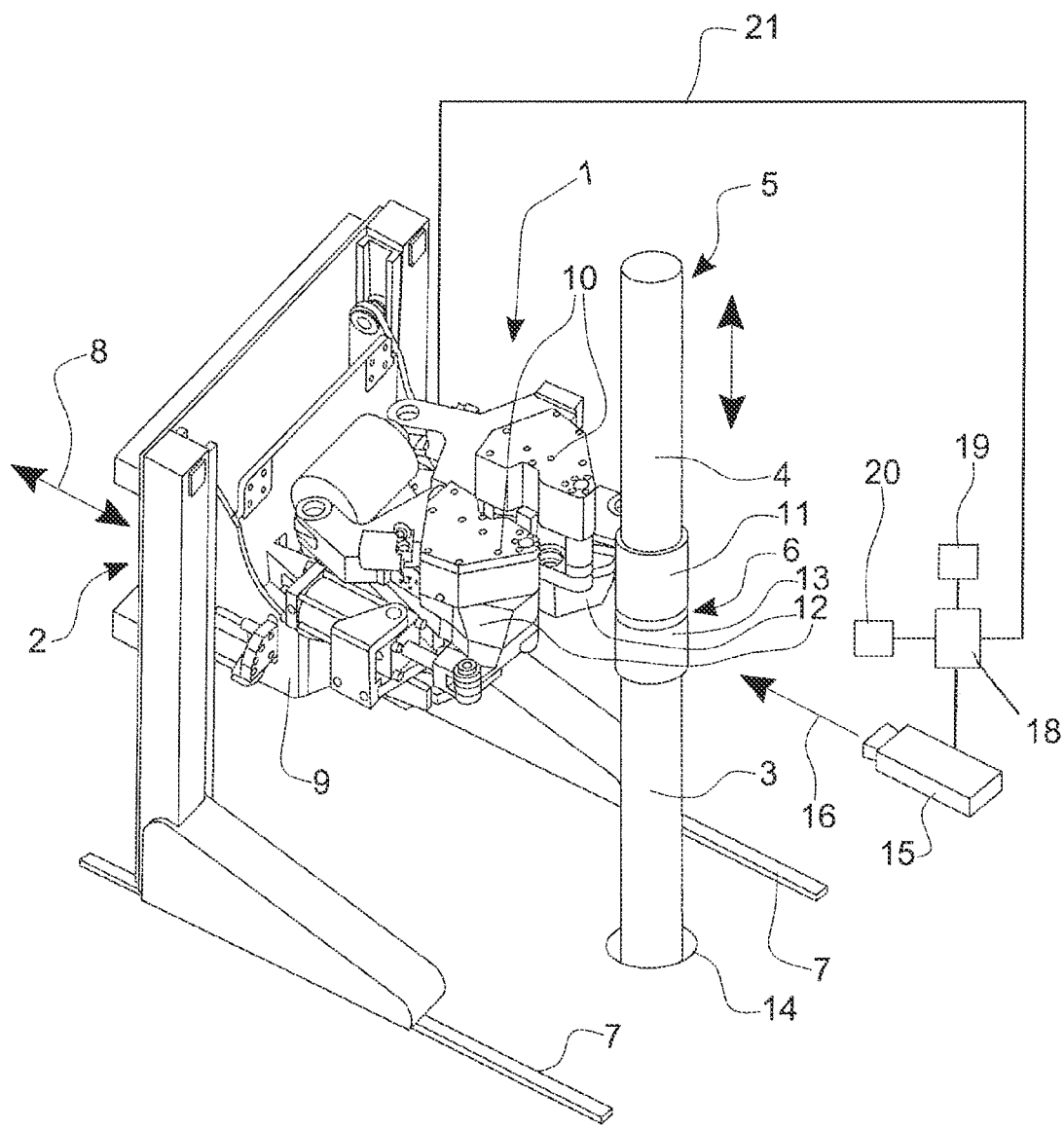
FIG. 1 is a perspective illustration showing a wrench control arrangement in accordance with an embodiment of the present invention.

Turning now to consider FIG. 1 in more detail, there is illustrated a combination torque wrench and spinning wrench 1 of a type generally known in the art as an iron roughneck. The iron roughneck 1 is mounted on a support 2 for positioning the iron roughneck relative to the drill pipes 3, 4 of a downhole drill string 5 and in particular for accurate positioning of the iron roughneck 1 relative to the tool joint 6 between the adjacent drill pipes 3, 4. The particular support 2 illustrated, which is merely exemplary, runs on tracks 7 to permit horizontal motion towards and away from the drill string 5 as illustrated schematically by arrow 8. The iron roughneck 1 is also mounted to a carriage 9 for vertical movement along the support 2.

In a generally conventional manner, the iron roughneck 1 itself comprises an upper pair of jaws 10 which are configured to cooperate in order to grip the joint part 11 at the lower end of the upper drill pipe 4 and which incorporate a spinning arrangement in order to rotate the upper drill pipe 4. The iron roughneck 1 further comprises a pair of lower jaws 12 which are configured to cooperate in order to grip the joint part 13 at the upper end of the lower drill pipe 3.

As already indicated above in the introductory part of this application, the vertical position of the iron roughneck 1 relative to the drill pipes 3, 4, and in particular the joint 6 between the two drill pipes, is crucial to the accurate and safe connection or disconnection of the two drill pipes.

The arrangement illustrated in FIG. 1 incorporates an automated system for determining the position of the uppermost end of the lower drill pipe 3 which is shown projecting from the well bore 14. As will become clear, the system is thus operable to determine the "stick-up height" of the lower drill pipe 3.

Figure 2:
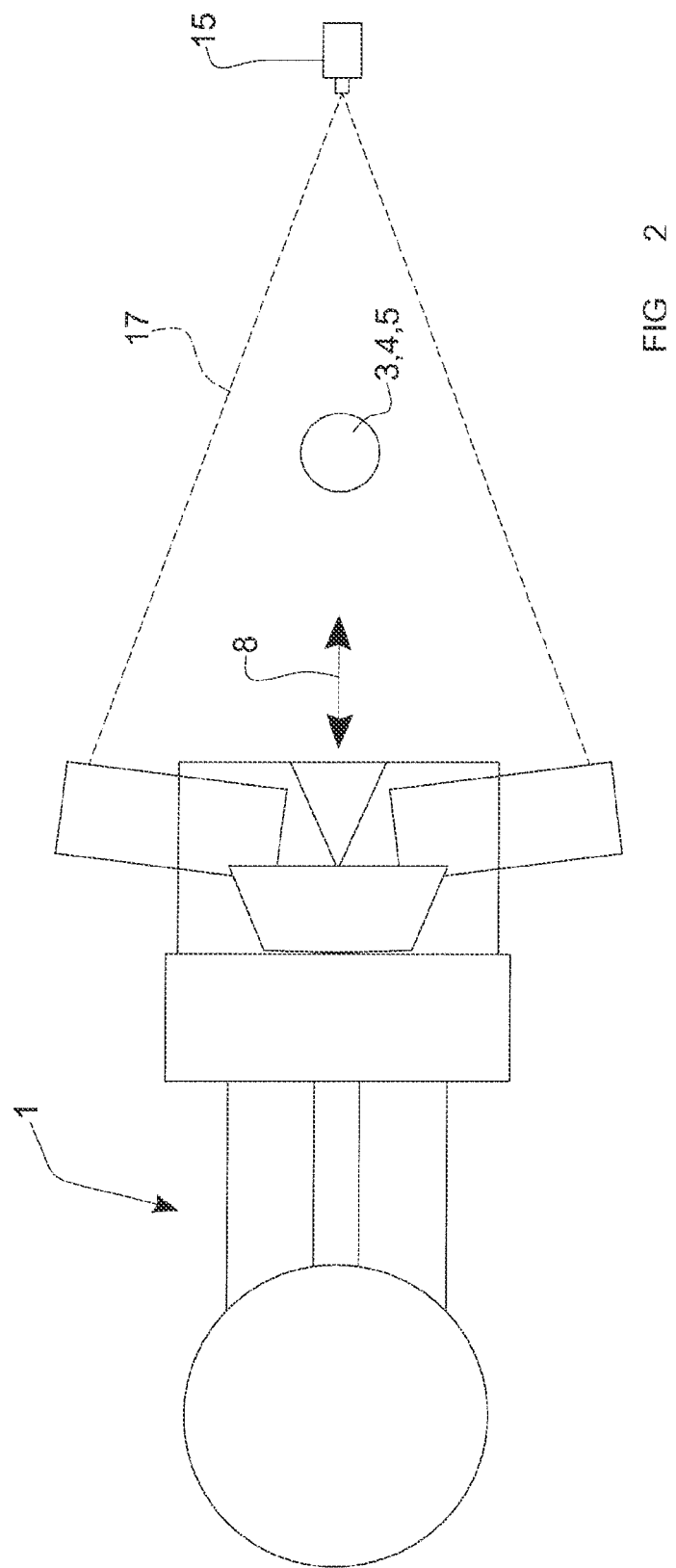
FIG. 2 is a schematic plan view from above, showing the arrangement of FIG. 1.

The system is illustrated schematically in FIG. 1 and comprises an imaging means such as a video camera 15 arranged to capture a real-time video image of the drill string 5, and in particular the region of the drill string 5 located above the well bore 14 in the region where joints 6 between adjacent drill pipes will typically be made up and/or broken by the iron roughneck 1. In the particular arrangement illustrated in FIGS. 1 and 2, the camera 15 is shown positioned on the opposite side of the drill sting 5 and its constituent drill pipes 3, 4 to the iron roughneck 1 and is arranged to view the drill pipes along a viewing direction 16 which is substantially parallel to the horizontal movement axis 8 of the iron roughneck 1. The field of view 17 of the camera 15 thus takes in both the drill pipes and the iron roughneck 1 behind the pipes as illustrated most clearly in FIG. 2. As will be explained below, however, alternative positions for the camera 15 are also possible.

The camera 15 is operatively and electrically connected to an electronic processor 18, which in turn is connected to a memory 19 and a display 20.

In this embodiment of the present invention, it is proposed that the processor 18 will be configured and operable to monitor and analyse the image captured by the camera 15 when the partially assembled or disassembled drill string 5 is stationary between successive run-in or draw-out steps, and to determine from the image the stick-up height of the drill pipe 3 projecting from the well 14 and hence determine the position of the uppermost end of the lower drill pipe 3. This information can then be used to control the vertical position of the iron roughneck 1 relative to the joint part 13 of the lower pipe 3 (and hence also relative to the joint part 11 of the upper pipe 4). The processor 18 is operatively connected, as illustrated schematically at 21, to a control arrangement configured to control the horizontal and vertical position of the iron roughneck 1 and so in this manner the system is effective to control the position of the iron roughneck 1 in dependence on the position of the joint part 13 of the lower drill pipe 3 projecting from the well bore 14.

The operating regime of the system will now be described in more detail, focussing initially on the situation where only the iron roughneck 1 and lower drill pipe 3 projecting from the well bore 14 are present in the field of view 17 of the camera; as will be the case after a length of the drill string 5 has been run-in to the well bore and before the next drill pipe 4 is connected to the string. As will be appreciated from the foregoing description, the goal in this situation is to determine the stick-up height of the projecting drill pipe 3 (and hence the vertical position of its joint part 13) when the drill string 5 becomes stationary after a run-in step. The processor achieves this via a motion detection algorithm.

More particularly, the camera 15 is activated to capture a sequence of video image as the iron roughneck 1 is moved towards the projecting drill pipe 3, along the movement axis 8. In practice, this operation of the camera will be automatically synchronised with the operation of the iron roughneck 1. The processor then operates to filter out from the captured image sequence all parts of the image containing motion during the sequence (i.e. the parts of the image depicting the iron roughneck 1), thereby leaving behind only static parts of the image, which of course will include the projecting drill pipe 3. The vertical position of the uppermost end of the projecting drill pipe 3 can then be determined from the static image parts remaining after the filtering step, because it will clearly contrast with the filtered-out parts of the image behind the pipe.

Figure 3:
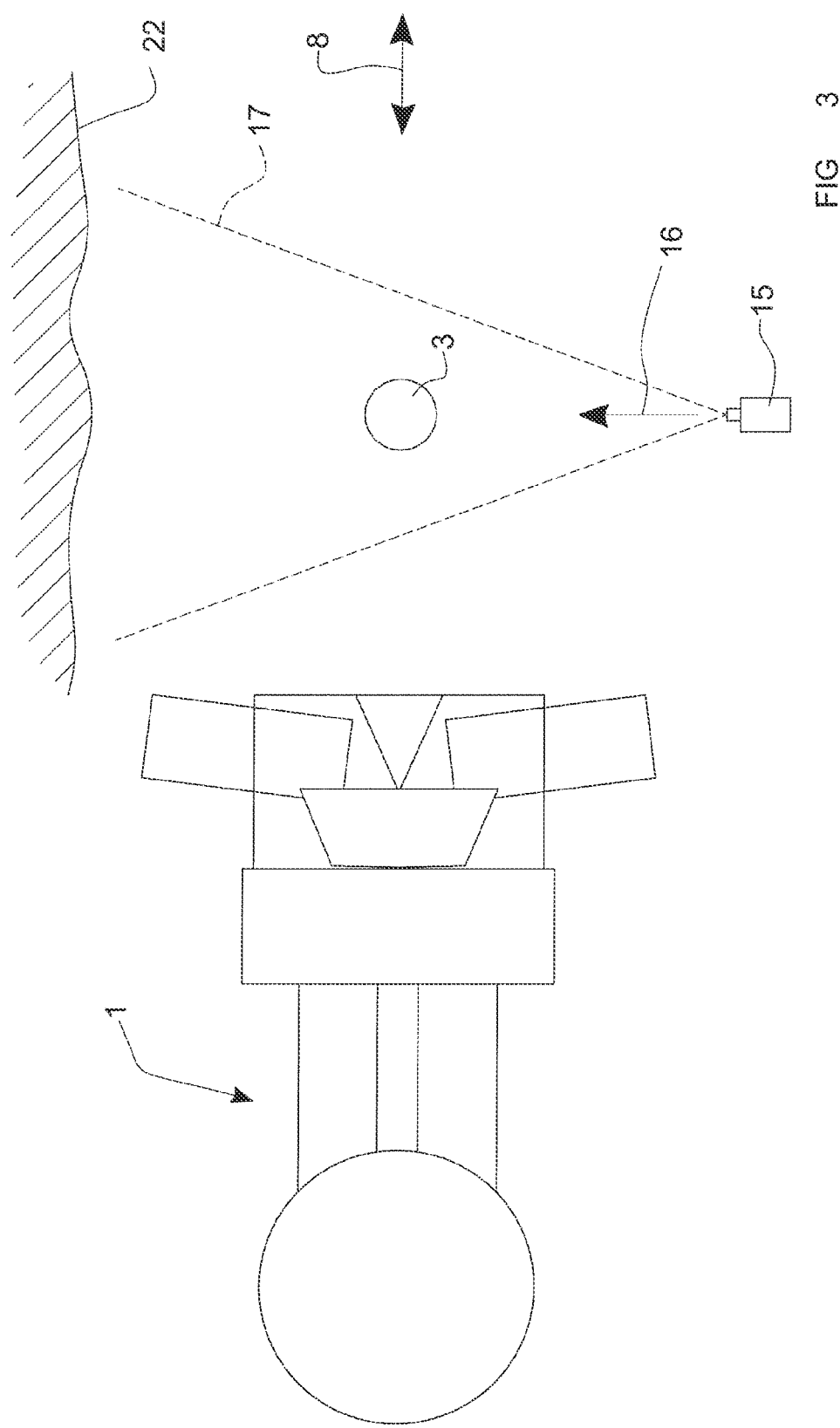
FIG. 3 is a view similar to that of FIG. 2, but showing an alternative arrangement.

Turning now to consider FIG. 3, there is shown an alternative position and viewing direction for the camera 15. As will be noted, in this arrangement the camera is not directed towards the iron roughneck 1, but instead is arranged such that its viewing direction is generally orthogonal to the movement axis 8 of the iron roughneck 1. As such, although the camera's field of view 17 still takes in the drill pipe 3, it excludes the iron roughneck 1. In this arrangement, of course, images captured by the camera 15 whilst the iron roughneck 1 is moving will therefore not include the iron roughneck 1. This means that the above-described motion detection and filtering regime will not function for this arrangement. Instead, the arrangement of FIG. 3 is proposed to operate via a background subtraction regime.

More particularly, in this arrangement, the system is initially calibrated by activating the camera in the absence of the drill pipe 3 so as to capture an image representative of the background 22 behind the well bore 14. This image is stored in the memory 19 as a datum image. It is envisaged that this calibration step will be repeated each time there is no drill pipe or drill string present in the camera's field of view 17, each time replacing the previously stored datum image with an up-to-date one, thereby ensuring that any changes in the background 22 over time are accounted for.

When the drill pipe 3 is present in the camera's field of view, for example after a run-in step of the drill string, the camera is then activated to capture an image of the drill pipe set against the background 22. The processor then operates to compare the captured image with the previous (and most up-to-date) datum image, and filters out from the captured image parts of the image which correspond to the datum image. This effectively serves to remove the background from the captured image, to leave only an image of the projecting drill pipe, from which the stick-up height and hence vertical position of the joint part 13 of the drill pipe 3 can be determined.

Figure 4:
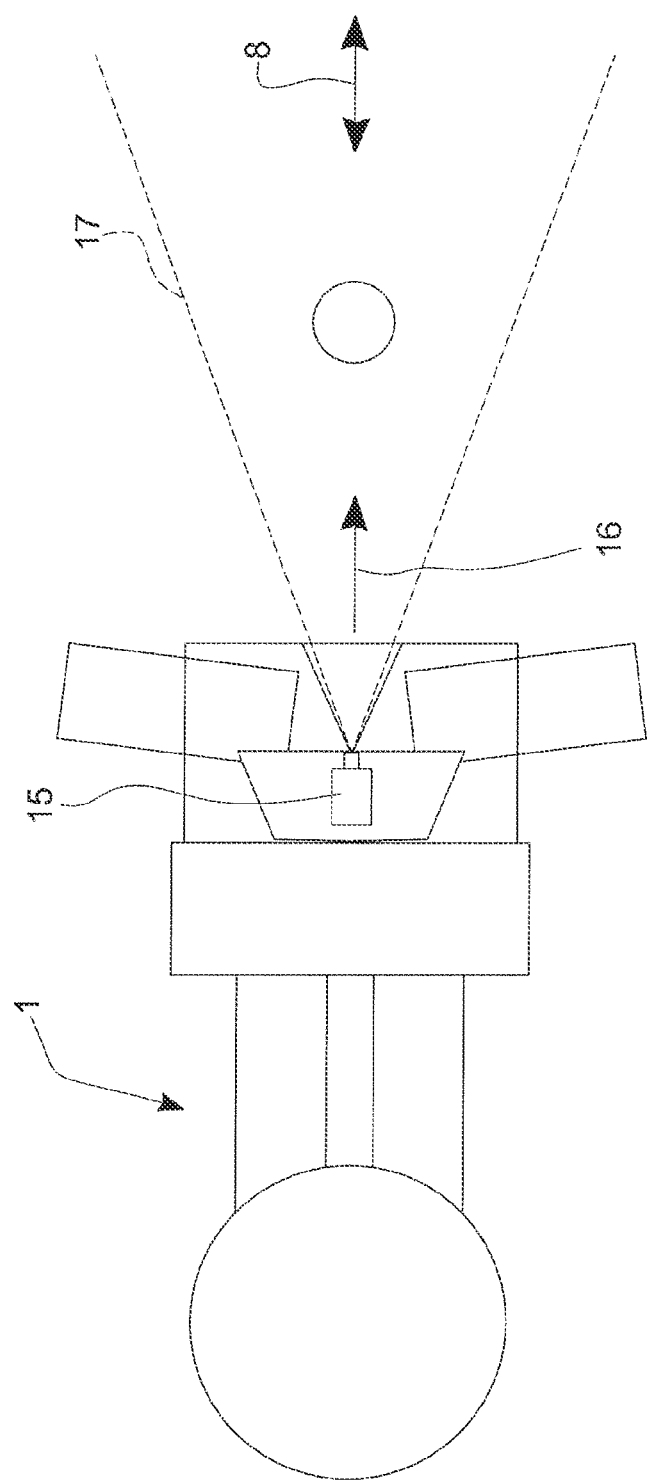
FIG. 4 is a view similar to that of FIGS. 2 and 3, but showing another alternative arrangement.

FIG. 4 illustrates another alternative arrangement in which the camera 15 is actually mounted on the iron roughneck 1 itself and arranged such that its viewing direction 16 coincides with, or is at least generally parallel to the movement axis 9 of the iron roughneck 1. As will be appreciated, the arrangement of FIG. 4 is suitable for the same background subtraction regime as the arrangement depicted in FIG. 3.

When the system is used during removal of a drill string 5 from the well bore 14, for control of the iron roughneck 1 to disconnect adjacent drill pipes 3, 4, the situation is somewhat different because of course in this situation the drill string 5 will run continuously from the bottom to the top of the images captured by the camera 15. This means that even in the case of the arrangement shown in FIG. 3, the motion detection regime will not function correctly in identifying the joint 6 between the two pipes because the drill string will obscure the iron roughneck 1. A different image processing regime is required for this situation, and it is proposed to use a scheme of contour analysis, relying on the enlarged width of the joint parts 13, 11 of the two drill pipes 3, 4 relative to the pipes themselves.

More particularly, the camera 15 will be activated when the drill string 5 comes to a stop after a draw-out step, to capture an image of the drill string comprising the lower end of the upper drill pipe 4 and the upper end of the lower drill pipe 3. The processor then operates to analyse the captured image using contour analysis to locate and identify the wider region of the two adjacent joint parts 11, 13. This provides an approximate location of the precise joint 6 between the two pipes, as represented by the upper edge of the lower drill pipe 3 projecting from the well bore 14. The processor then performs an edge detection algorithm on the part of the captured image deemed to depict the approximate position of the joint, searching for large transitions in image colour to determine the exact position of the tool joint 6 which can then be used to control the iron roughneck 1 accurately.

Figure 5:
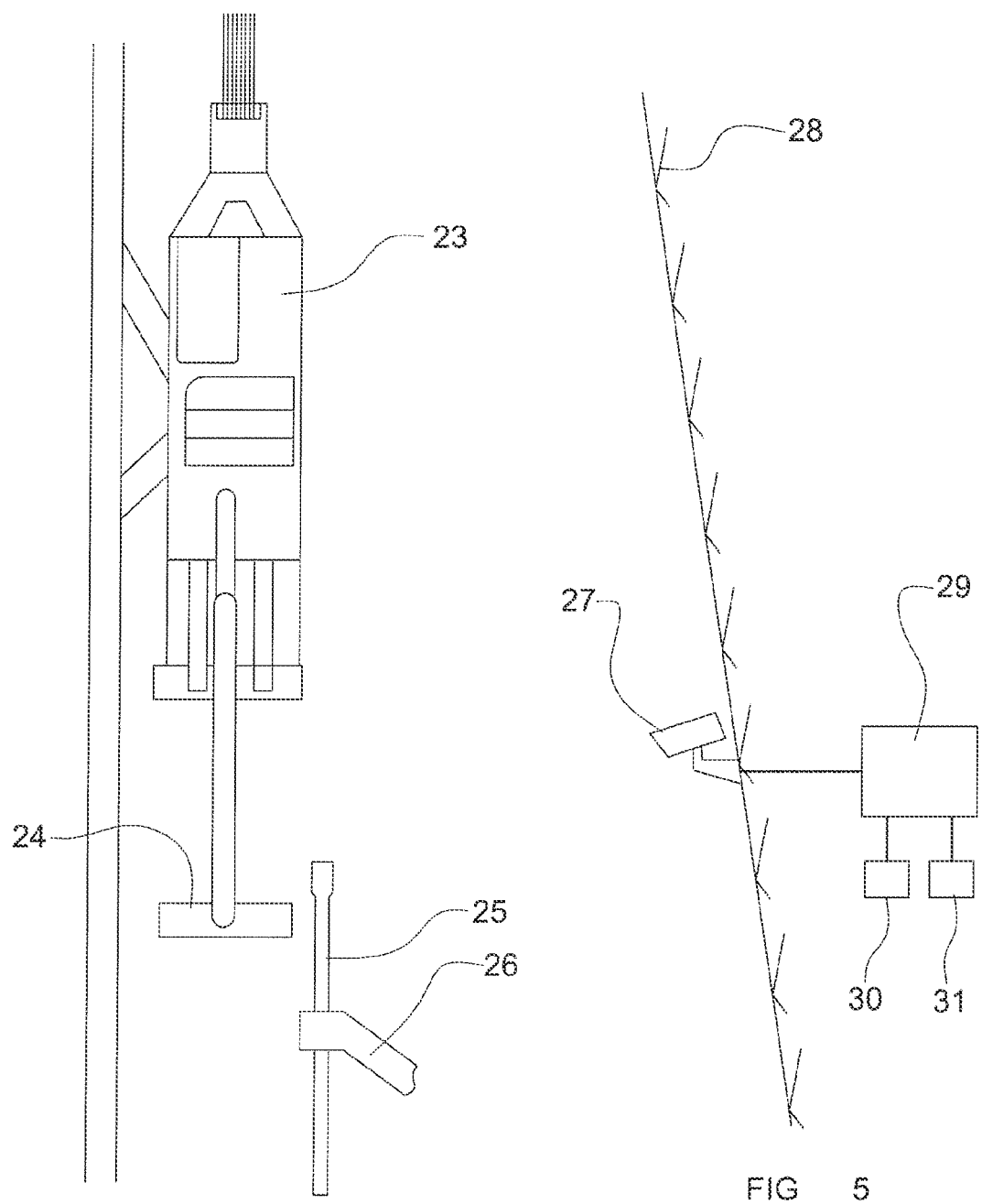
FIG. 5 is a side elevational view showing an elevator suspended below a top drive, and a drill pipe supported by a pipe handling device.

Turning now to consider FIG. 5, there is illustrated a general arrangement of drilling equipment at a position spaced above the drill floor of a drilling platform. In particular, there is illustrated a top drive 23, of a type known per se, from which there is suspended an elevator 24. The top drive 23 is operable to lift and lower the elevator 24 in a known manner. The elevator 24, as will be described in more detail, is configured to close around and grip a drill pipe 25, which may comprise part of a preassembled stand, typically at a position high above the drill floor. FIG. 5 shows the drill pipe adjacent to and disengaged from the elevator and supported by a pipe handling device 26 at a position generally below the elevator. The pipe handling device 26 is operable in concert with the elevator to present the drill pipe 25 for engagement by the elevator 24.

FIG. 5 also shows a camera which is mounted to and supported by a structure such as a derrick 28. The camera 27 is mounted at a position slightly above the height of the elevator 24 and is directed towards the elevator so as to capture images of the elevator, and the adjacent drill pipe 25, looking downwardly towards the elevator. The camera 27 is operatively and electrically connected to an electronic processor 29 (illustrated schematically in FIG. 5), and the processor is connected to a memory 30 and a display 31.

The system illustrated in FIG. 5 is operable to determine automatically whether or not the drill pipe 25 is engaged by the elevator 24, as will be described in more detail below.

Figure 6:
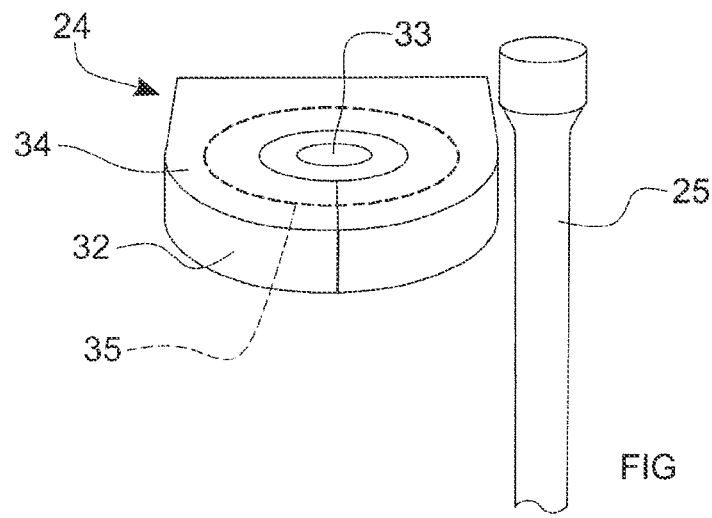
FIG. 6 is a schematic illustration showing the elevator and the drill pipe, as viewed by an imaging means.

FIG. 6 is a schematic illustration representative of the type of image which will be captured by the camera 27 upon activation of the camera. As will be noted, the elevator is viewed generally from the front, and importantly from slightly above. The elevator 24 comprises a selectively openable and closeable collar 32, which is shown in FIG. 6 in a closed condition. When closed, the collar defines a central aperture 33 which is sized to fit tightly around the drill pipe 25 in a known manner. It is also to be noted that, as viewed by the camera 27, the collar 32 presents a generally elliptical flat upper face 34. Alternative configurations of elevator 24 may present a flat upper face having the appearance of a skewed rectangle when viewed by the camera 27.

The elevator 24 may have a predetermined pattern (indicated schematically at 35) painted or otherwise applied to its upper face 35, clearly presented to the camera 27. It is proposed that such a pattern will present easily identifiable markers to the camera 27 and its associated processor 29.

FIG. 6 depicts the elevator 24 disengaged from the drill pipe; i.e. without the drill pipe located within the central aperture 33 of the collar 32. To calibrate the system, the camera 27 can capture an image of the upper surface 34 of the elevator in this condition; i.e. without the drill pipe being gripped by the elevator. This image is stored in the memory 30 as a first datum image representative of the elevator without a drill pipe located in its collar.

Figure 7:
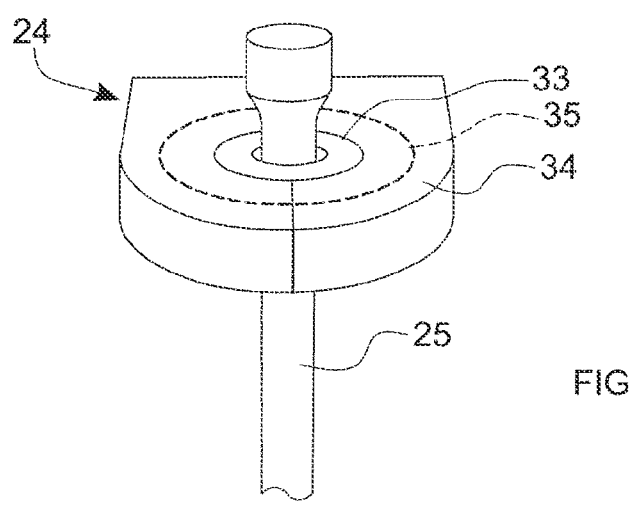
FIG. 7 is a view similar to that of FIG. 6, but which shows the elevator closed around and gripping the drill pipe.

A second datum image is then taken by the camera 27, representative of the elevator engaging the drill pipe 25 as depicted in FIG. 7. This second datum image is also stored in the memory 30.

Once the system has been calibrated in this way, with the two datum images stored in the memory 30, the system can be operated at any instant to capture an image of the elevator 24, and to analyse the captured image via the processor 29 to determine whether or not the drill pipe 25 is properly received and engaged by the elevator 24 as depicted in FIG. 7. In order to make this determination, the processor is operable to compare the instant captured image of the elevator 23 with the two datum images. Preferably, this will be done using a colour based segmentation technique on the basis of the pattern 35 applied to the upper surface 34 of the elevator.

For the case of the drill pipe 25 not being located within the elevator, as depicted in FIG. 6, the captured image of the elevator will display a continuous ellipse (or skewed rectangle as appropriate depending on the configuration of the elevator) which can be readily matched to the first datum image by the processor to return a signal or message on the display 31 indicating that the elevator is disengaged from the drill pipe.

For the case of the drill pipe 25 being located within and hence engaged by the elevator 24, as depicted in FIG. 7, the captured image of the elevator will show the ellipse (or skewed square) being broken by the obscuring drill pipe in the region where the drill pipe is located; i.e. the region of the upper surface 34 (and hence also its pattern 35) located furthest from the camera. This can be readily matched to the second datum image by the processor to return a signal or message on the display indicating that the elevator is properly engaged with the drill pipe.

Figure 8:
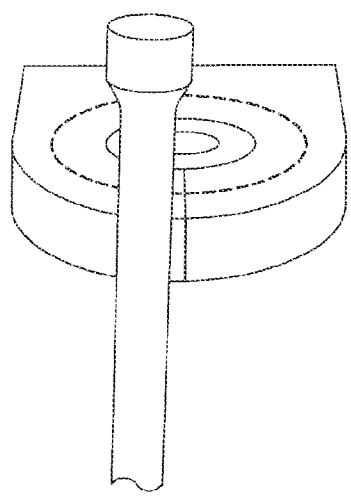
FIG. 8 is a view similar to that of FIG. 7, but which shows the elevator partially obscured by the drill pipe and the drill pipe outside the elevator.

It is to be noted that in the engaged condition illustrated in FIG. 7, the front region of the upper surface 34 (and hence also its pattern 35) is not broken by the drill pipe 25. It is impossible for the drill pipe 25 to occlude the rear part of the upper surface 34 (and optional pattern 35) but not the front part unless the drill pipe 25 is, in fact, located within the elevator as depicted in FIG. 7. This provides an important fail-safe as it is impossible for the system to determine incorrectly that the drill pipe is located within the elevator. In contrast, FIG. 8 illustrates an image captured by the camera 27 in which both the rear and front parts of the upper surface 34 are occluded by the drill pipe. As will be appreciated, such a situation is indicative of the drill pipe being located outside the elevator.

Whilst the invention has been described above with reference to specific exemplary embodiments, it is to be appreciated that various and extensive modifications or alterations could be made without departing from the scope of the disclosure. For example, although reference is made above to the use of video cameras, it will be appreciated that several of the embodiments described above could instead operate using a still camera. In the particular case of the arrangement of FIGS. 1 and 2 which is described above as using a video camera operable to capture a video sequence of images, the arrangement could quite easily be modified to use a still camera operable to capture a sequence comprising a plurality of discrete still images.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. It is intended that the following claims be interpreted to encompass all such variations and modifications.

What is claimed is:

1. A system for determining a position of a downhole drill pipe relative to a wrench arrangement, and for controlling the wrench arrangement for connecting adjacent drill pipes in a downhole drill-string and comprising:
    an imaging means configured to capture a sequence of images of the drill-string in a region above a well bore for engagement by a wrench whilst the wrench arrangement is moved towards the drill pipe projecting from the well bore, the sequence of images includes a static position of the drill pipe and the wrench arrangement while moving;
    a processor operable to:
    analyze said captured images; and to determine therefrom, via a motion detection algorithm, position of an uppermost end of the drill pipe projecting from the well bore relative to said wrench; and
    filter out parts of said image sequence containing motion and to determine from remaining static parts of the image the position of the uppermost end of the drill pipe; and
    control means operable in response to signals from the processor to control the position of the wrench arrangement in dependence on the position of the uppermost end of said drill pipe projecting from the well bore; and
    for disconnecting adjacent drill pipes in the drill-string:
    said imaging means is configured to capture an image of a joint between connected ends of said adjacent drill pipes in a region of the drill-string above the well bore; and
    said processor is operable to:
    analyze said captured image and to determine therefrom position of an uppermost end of a lower of said drill pipes projecting from the well bore, and
    analyze the edge contours of said drill-string in said captured image to determine position of said joint and then to perform an edge detection algorithm on the region of said image depicting said joint to determine the uppermost end of the lower of the drill pipes.

2. The system of claim 1, wherein said imaging means is positioned on a side of the drill pipe opposite the wrench arrangement.

3. The system of claim 1, configured to control the wrench arrangement for disconnecting adjacent drill pipes in the drill-string, wherein:
    the system further comprises control means operable in response to signals from the processor to control position of the wrench arrangement in dependence on the position of the uppermost end of the lower of the drill pipes projecting from the well bore.

4. The system of claim 1, further comprising:
    apparatus for determining the position of a downhole drill pipe relative to an elevator configured to lift and lower drill pipes, the elevator comprising a collar configured to fit around and grip a drill pipe; the apparatus comprising:
    a collar imaging means arranged to capture an image of said collar and the drill pipe in a region of the pipe for engagement by the collar; and
    a processor operable to analyze said image and to determine therefrom whether or not a drill pipe is received within the collar.

5. The apparatus of claim 4, further comprising a memory configured to store a first datum image from said collar imaging means, the first datum image depicting said collar; without a drill pipe therein.

6. The apparatus of claim 5, wherein said memory is further configured to store a second datum image from said collar imaging means, the second datum image depicting said collar with a drill pipe received therein.

7. The apparatus of claim 5, wherein said processor is operable to compare the image of said collar and the drill pipe with the first datum image and to determine from said comparison whether or not the drill pipe is received within said collar.

8. The apparatus of claim 7, wherein said processor is operable to perform said comparison in accordance with a color based segmentation algorithm.

9. The system of claim 1, wherein said imaging means is a video camera.

10. The system of claim 1, wherein said imaging means is a still camera.

11. The system of claim 10, wherein said still camera is configured to capture a plurality of successive images.

12. The system of claim 1, wherein the processor is configured to control horizontal and vertical position of the wrench arrangement via the control means.

13. The system of claim 1, wherein the capture of the sequence of images is synchronized with operation of the wrench arrangement.

14. A method for controlling a wrench arrangement for connecting and disconnecting adjacent drill pipes in a downhole drill-string, comprising:
    capturing a sequence of images of the drill-string in a region above a well bore whilst the wrench arrangement is moved towards the drill pipe projecting from the well bore, the sequence of images includes a static position of the drill pipe and the wrench arrangement while moving;
    analyzing said captured images; and determining therefrom position of an uppermost end of the drill pipe projecting from the well bore relative to said wrench arrangement;
    filtering out parts of said image sequence containing motion and determining from remaining static parts of the image the position of the uppermost end of the drill pipe;
    controlling the position of the wrench arrangement in dependence on the determined position of the uppermost end of said drill pipe projecting from the well bore;
    capturing an image of a joint between connected ends of said adjacent drill pipes in a region of the drill-string above the well bore;
    analyzing said captured image and determining therefrom position of an uppermost end of a lower of said drill pipes projecting from the well bore;

analyzing edge contours of said drill-string in said captured image to determine position of said joint; and performing an edge detection algorithm on the region of said image depicting said joint to determine the uppermost end of the lower of the drill pipes.

15. The method of claim 14, wherein the capturing comprising positioning a camera on a side of the drill-string opposite the wrench arrangement.

16. The method of claim 14 further comprising:

controlling position of the wrench arrangement in dependence on the determined position of the uppermost end of the lower of the drill pipes projecting from the well bore.

17. The method of claim 14, wherein controlling position comprises controlling horizontal and vertical position of the wrench arrangement based on the captured image.

18. The method of claim 14, wherein the filtering comprises filtering out parts of the image depicting the wrench arrangement.

* * * * *